Aug. 9, 1960 C. KYLE Re. 24,860

METHOD AND APPARATUS FOR MAKING HOLLOW ACCRETED FIBROUS BODIES

Original Filed May 2, 1952 3 Sheets-Sheet 1

INVENTOR:
COLIN KYLE
BY Spencer, Johnston, Cook & Root
ATT'YS

INVENTOR:
COLIN KYLE
BY Spencer, Johnston, Cook & Root
ATT'YS

INVENTOR:
COLIN KYLE
BY Spencer, Johnston, Cook & Root
ATT'YS

United States Patent Office

Re. 24,860
Reissued Aug. 9, 1960

24,860

METHOD AND APPARATUS FOR MAKING HOLLOW ACCRETED FIBROUS BODIES

Colin Kyle, Geneva, Ill., assignor to Hawley Products Company, St. Charles, Ill., a corporation of Delaware Original No. 2,723,600, dated Nov. 15, 1955, Ser. No. 285,831, May 2, 1952. Application for reissue Nov. 15, 1957, Ser. No. 697,302

11 Claims. (Cl. 162—219)

Matter enclosed in heavy brackets [ ] appears in the original patent but forms no part of this reissue specification; matter printed in italics indicates the additions made by reissue.

This invention relates to a method and apparatus for making hollow accreted fibrous bodies, more particularly unitary hollow contoured bodies and especially hollow bodies where the clearance between opposite walls or sides of the hollow body is relatively small.

Hollow bodies of the type contemplated by the invenvention are especially useful as packaging elements for watches, instruments, and other delicate devices which are readily damaged in shipment and require special precautions to prevent such damage. Attempts to make such hollow bodies by injecting pulp mixtures into a mold have been made but the distribution of the pulp is generally non-uniform, with the result that weakened places develop particularly at or near the juncture of opposing walls separated by a relatively narrow space.

One of the objects of the present invention is to provide a new and improved method for making hollow bodies.

Another object of the invention is to provide a new and improved method for making hollow bodies from fibrous materials by accretion onto a foraminous mold.

Still a further object of the invention is to provide a new and improved method for making hollow bodies in which some of the walls are spaced from each other only a limited distance.

An additional object of the invention is to provide a new and improved apparatus for making hollow bodies of the type described.

Other objects and advantages of the invention will be apparent by reference to the following description in conjunction with the accompanying drawings in which.

In accordance with the invention a hollow body is formed by first accreting at least two separate components of the hollow body in an aqueous bath containing fibers of the material which are to be accreted in forming said body, then without removing the accreted component parts from the bath, bringing said parts together and continuing the accreting operation until the fibers become knitted at the junctures of said component parts. In this manner a unitary hollow body is formed, with the junctures of the component parts being completely sealed. The hollow body is then removed from the bath and dried in any suitable manner by introducing heated air into the interior of the hollow body through a suitable opening and subjecting opposite sides of the hollow body to suction to cause the heated air to be drawn through the walls of the hollow body.

Figure 1:
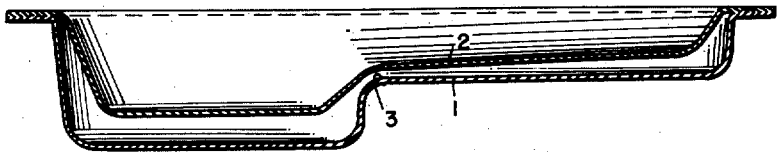
Figure 1 represents a cross sectional view of a hollow body that can be manufactured in accordance with the invention.
Figure 2:
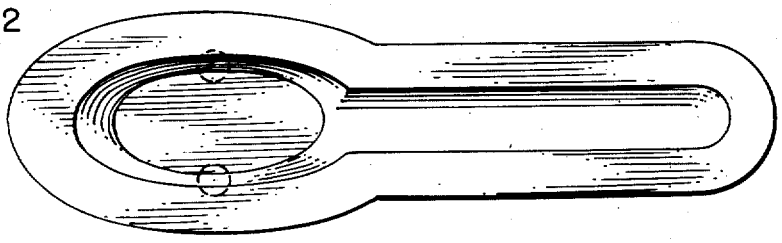
Figure 2 is a plan view of the hollow body shown in Figure 1.

In the drawings the hollow body is illustrated as a packaging unit which can be used, for example, as a wristwatch case. It will be understood, however, that the invention can be used in manufacturing various other types of hollow bodies and especially those which are suitable for use as packaging units. In this connection it will be noted that the walls 1 and 2 in the hollow body illustrated in Figure 1 are rather close together at the point 3. When it is attempted to manufacture a piece of this kind by injecting a pulp mixture into a suitable foraminous mold and withdrawing water through the openings in the mold the rush of water through the narrow passageway illustrated by the numeral 3 causes the fibers to be washed away at this point with the result that the structure of the hollow body thus produced is relatively weak and non-uniform.

Figure 3:
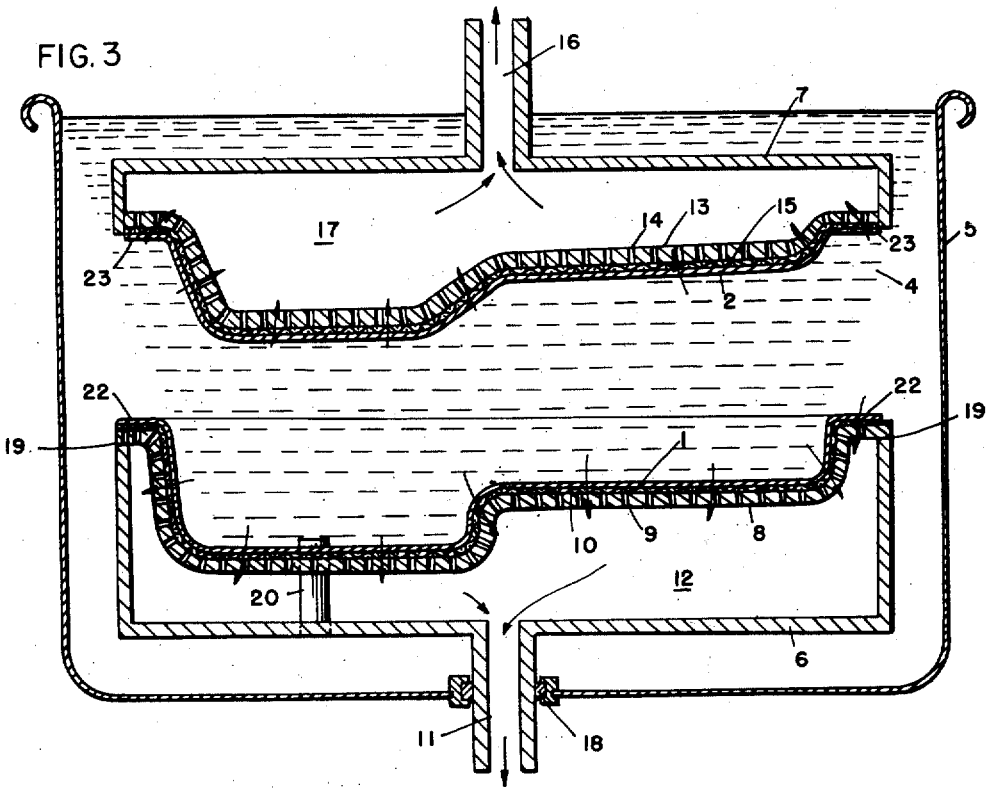
Figure 3 illustrates in section an elevational view of an apparatus which can be used in the practice of the invention and also illustrates the first step in carrying out the method.

For the practice of the present invention at least two component parts of the hollow body member are separately formed in a felting bath. As illustrated in Figure 3 the felting bath 4 is held in a suitable container or tank 5. The felting bath can consist of a mixture of fibers in a liquid, for example, cellulose fibers in water with or without the addition of resins or other materials that may be added for a specific purpose.

In the embodiment of the invention illustrated in Figure 3 two dies 6 and 7 are provided to form two component parts of the hollow body. The die 6 which in the embodiment illustrated is located near the bottom of the tank 5 is provided with a contoured surface 8 generally corresponding to the shape of one of the walls of the hollow body member and provided with holes or apertures 9 over which is placed a foraminous screen 10 having a large number of relatively fine openings. An outlet 11 is connected to a suitable source of vacuum, not shown, by means of which suction can be exerted on the interior 12 of the die 6 thereby causing the fibers from the felting bath 4 to be deposited on the screen 10. These fibers when built up to a suitable thickness form the component wall 1 of the hollow body.

The die 7 is similar to the die 6 except that it is a male rather than a female die. The portion 13 of the die 7 generally conforms to the shape of one of the walls of the hollow body which is to be formed and is provided with apertures 14 over which is placed a foraminous screen 15 similar to the screen 10. The outlet 16 is connected to a suitable source of vacuum, not shown, to create suction in the space 17 thereby causing the fibers in the bath 4 to be deposited on the screen 15. When these fibers build up to the desired thickness the wall 2 of the hollow body is formed.

It should be noted that the dies 6 and 7 are relatively movable one with respect to the other in an axial direction so that they can be brought together beneath the surface of the bath and thereafter both dies, carrying the hollow body between them, can be moved out of the bath. Any suitable mechanism can be provided for moving the dies, the type of mechanism employed being immaterial from the standpoint of this invention. If desired the dies can be moved by hand. A suitable seal 18 is provided around the outlet pipe 11 to prevent the escape of liquid from the bath.

Figure 6:
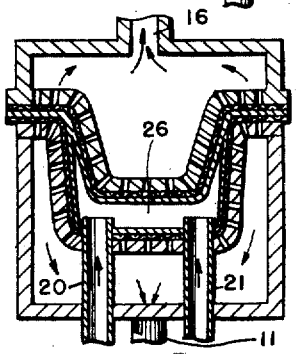
Figure 6 is a cross sectional view of the apparatus shown in Figure 5.

In the structure shown in Figure 3 the die 6 is separable at the point 19 and the upper or foraminous portion 8 can be removed from the bath together with the hollow body that is formed when the upper and lower dies are brought together. In the embodiment shown a tubular member 20 extends through the lower side of the die 6 and also through the aperture portion 8 and the screen 10 and projects above the wall 1 of the hollow body that is formed on the screen 10. The purpose of the tube 20 is to form an opening in the wall 1 of the hollow body in order to allow the fluids of the bath to enter the interior cavity of the hollow body after the dies 6 and 7 have been brought together and to facilitate drying of the hollow body after the latter has been formed and in the manner hereinafter described. As shown in Figure 6 it is preferable to provide two tubes 20 and 21 to form a pair of openings in the hollow body.

Figure 4:
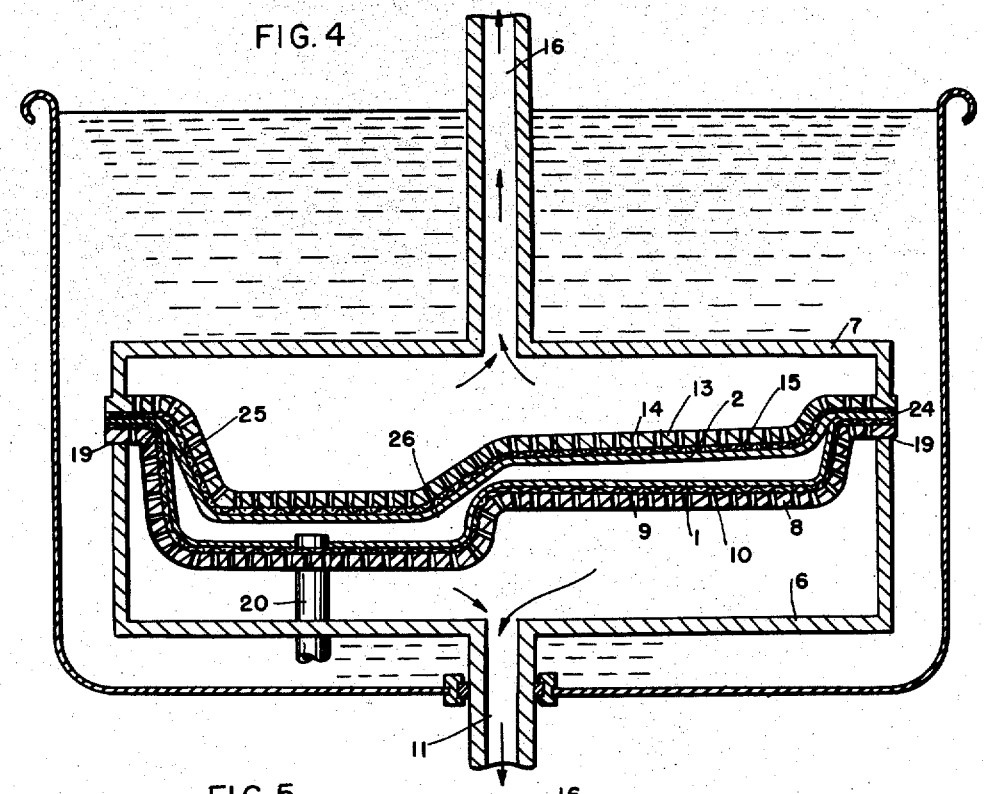
Figure 4 shows the apparatus of Figure 2 in the position occupied by the elements thereof in carrying out the second step of the method.

When the walls 1 and 2 have been formed to the desired thickness by the accretion or deposition of fibers on the screens 10 and 15 respectively of the dies 6 and 7 the die 7 is moved downwardly as shown in Figure 4.

It will be noted that the component parts 1 and 2 of the hollow body are formed with flanges 22 and 23, respectively, which extend around the margins or edges of these component parts.

Figure 9:
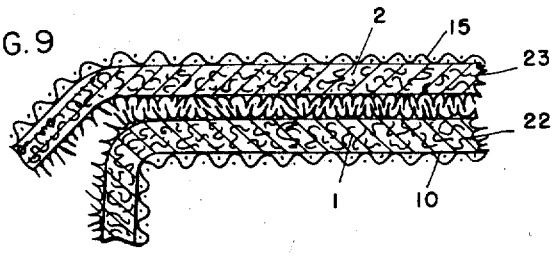
Figure 9 illustrates the knitting of the edges of the hollow body member during the operation of the process in the step carried out in Figure 4.

After fibers have been accreted to the desired thickness in forming the component parts or walls 1 and 2 the die 7 is moved axially until the flange portions 22 and 23 unite as shown in Figure 4 to form a unitary flange 24. It is essential for the purpose of the invention that this uniting of the accreted components take place as a part of the accreting process and without removing these components from the bath. The reason for this can be explained with reference to Figure 9 wherein it will be seen that the individual fibers of the article tend to extend outwardly from the face of the component parts 1 and 2 and unite with each other when the flanges 22 and 23 are brought together in the wet. However, if these fibers are removed from the bath they become flattened against the side of the flange and do not interlace and combine in the proper manner.

When the separately formed accreted wall portions are brought together and united at the flanges the exertion of suction through the lines 11 and 16 in Figure 4 is continued and there is a substantial build-up of fibrous material at the point 25 thereby further strengthening the bond between the component parts 1 and 2. This build-up is made possible by the fact that the pipes or tubes 20 and 21 extend into the interior of the hollow body and permit circulation of the fiber-liquid bath to the space 26 after the component parts 1 and 2 have been united by the flange 24.

In a relatively short time after the component parts 1 and 2 have been united the bond between these parts is sufficiently strong to permit removal of the hollow body from the bath. This removal can be accomplished in several ways, for example as previously explained by removing the aperture portion 8 of the die 6 which is separable from the die 6 at the point 19. Hence the aperture portion 8 can be moved upwardly together with the die 7 and with the hollow body between them. Alternatively the entire die structures 6 and 7 can be moved axially out of the bath. Regardless of whether both dies are removed from the bath or whether the upper die is removed together with the hollow body member and the screen portion of the lower die, the next step is to dry the hollow body member and this is preferably accomplished in the manner illustrated in Figure 5.

Figure 5:
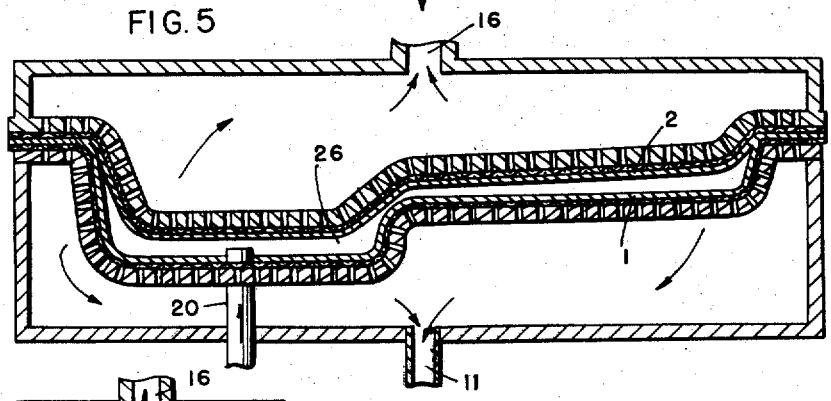
Figure 5 illustrates the position of the elements of the apparatus in carrying out the third step of the method.

As shown in Figures 5 and 6 the hollow body member carried between two foraminous dies is dried by introducing hot air through the tubes 20 and 21 into the central space 26 of the hollow body member and simultaneously applying suction through the pipes 16 and 17 to cause the heated air to be pulled outwardly from the interior spce 26 through the walls 1 and 2. In this way the moisture which still remains from the accreting bath is rapidly removed and the hollow article is dried to the desired moisture content. The dies are then separated and the hollow article is removed.

Figure 7:
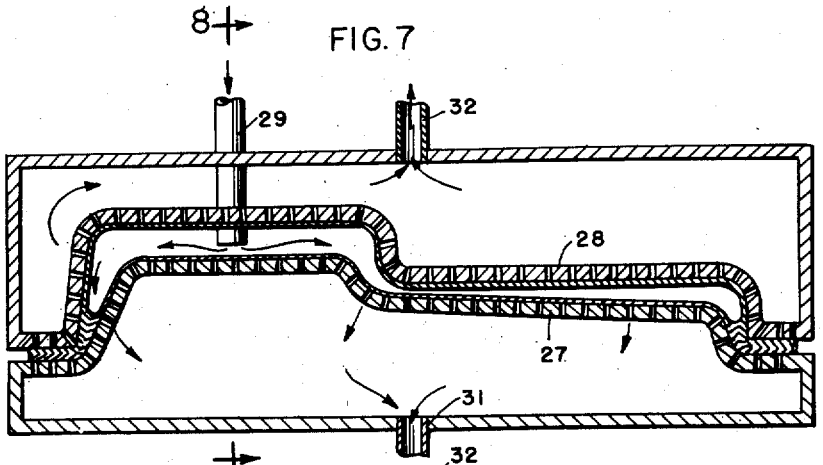
Figure 7 illustrates a variation of the arrangement of the parts of the apparatus shown in Figure 5.
Figure 8:
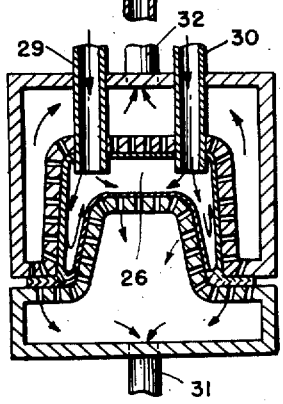
Figure 8 is a cross sectional view of the apparatus shown in Figure 7.

Figures 7 and 8 illustrate an alternative embodiment of the invention in which the hollow article is removed from the dies 6 and 7 before being dried between a pair of drying dies 27 and 28. The general method of drying, however, is essentially the same. Heated air is introduced into the interior 26 of the hollow article through pipes 29 and 30. Suction is applied through pipes 31 and 32 thereby drawing the heated air from the interior of the hollow article through the walls and removing the moisture laden air.

It will be recognized that a large number of hollow articles may be made simultaneously from the same felting bath. The invention is not limited to the employment of any particular type of fiber for forming the hollow article. Examples of suitable fibers are kraft, sisal, henequen, caroa (Brazilian pineapple), glass fibers and mixtures of such fibers.

The invention makes it possible to produce stronger hollow fiber articles having closely spaced side walls at one or more points than can be obtained by injecting a fiber-liquid mixture into a unitary mold or form. The invention also avoids thin, non-uniform distribution of the fibers which occurs when such articles are made by the injection method.

In the type of hollow article illustrated in the drawings the flanges which are provided for uniting the two component parts of the article can, if desired, be removed mechanically, for example by sawing or punching. The component parts of the article can also be knitted together by internal flanges or without substantial flanged portions. Instead of two complemental component parts the article may be formed from three or more complemental component parts using a corresponding number of dies. The method of forming the article with an external flange represents a preferred embodiment of the invention.

It will be understood that the size and contours of articles formed in the practice of the invention may vary widely depending upon the purpose for which the article is used.

The invention is hereby claimed as follows:

1. A method of making fibrous hollow articles which comprises accreting fibrous separate component parts of a hollow body in predetermined shapes from a fiber-liquid bath, said parts defining a substantially enclosed hollow space between them when brought together, bringing said accreted component parts together without removing them from said bath, and thereafter continuing to accrete fibers on the inner surfaces of the resultant hollow article until said parts are securely united.

2. A method of making fibrous hollow articles which comprises accreting fibrous separate component parts of a hollow body in predetermined shapes from a fiber-liquid bath, said parts defining a substantially enclosed hollow space between them when brought together, said component parts each having a flange complemental one with the other, bringing said flanges of said accreted component parts together without removing them from said bath, and thereafter continuing to accrete fibers on the inner surfaces of the resultant hollow article until said parts are securely united.

3. A method of making fibrous hollow articles which comprises accreting two fibrous component parts of a hollow body in predetermined shapes from a fiber-liquid bath, said parts defining a substantially enclosed hollow space between them when brought together, each of said component parts being provided with flanges that are complemental one with the other, bringing said flanges of said accreted component parts together without removing them from said bath, and thereafter continuing to accrete fibers on the inner surfaces of the resultant hollow article until said parts are securely united.

4. A method of making fibrous hollow articles which comprises accreting fibrous separate component parts of a hollow body in predetermined shapes from a fiber-liquid bath, said parts defining a substantially enclosed hollow space between them when brought together, bringing said accreted component parts together without removing them from said bath, thereafter continuing to accrete fibers on the inner surfaces of the resultant hollow article until said parts are securely united, and during said last named accretion introducing a portion of the fiber-liquid mixture into the hollow body of the article.

5. A method of making fibrous articles which comprises accreting fibrous separate component parts of a hollow body in predetermined shapes from a fiber-liquid bath, said parts defining a substantially enclosed hollow space between them when brought together, bringing said accreted component parts together without removing them from said bath, thereafter continuing to accrete fibers on the inner surfaces of the resultant hollow article until said component parts are securely united, removing the resultant article from the fiber-liquid mixture, and introducing a heated fluid into said hollow body of said article.

6. A method of making fibrous articles which comprises accreting fibrous separate component parts of a hollow body in predetermined shapes from a fiber-liquid bath, said parts defining a substantially enclosed hollow space between them when brought together, bringing said accreted component parts together without removing them from said bath, thereafter continuing to accrete fibers on the inner surfaces of the resultant hollow article until said component parts are securely united, removing the resultant article from the fiber-liquid mixture, and introducing a heated fluid into said hollow body of said article while applying reduced pressure to the exterior of said article.

7. An apparatus for making hollow fibrous articles comprising means to contain a fiber-liquid bath, separate forming dies each adapted to be submerged in said bath and to form by accretion a complemental component part of a fibrous contoured hollow article, said parts defining a substantially enclosed hollow space between them when brought together, means to move said dies one with respect to the other to bring them in juxtaposition in said bath with said parts adjoining and defining said hollow space, and means to introduce a portion of said bath between said dies and into said hollow space when said dies are brought into said juxtaposition.

8. An apparatus for making hollow fibrous articles comprising means to contain a fiber-liquid bath, separate forming dies each adapted to be submerged in said bath and to form by accretion a complemental component part of a fibrous contoured hollow article, said parts defining a substantially enclosed hollow space between them when brought together, means to move said dies one with respect to the other to bring them in juxtaposition in said bath with said parts adjoining and defining said hollow space, means to introduce a portion of said bath between said dies and into said hollow space when said dies are brought into said juxtaposition, and means for applying suction within said dies communicating with the surfaces of said dies to cause fibers to be deposited thereon from said fiber-liquid bath.

9. An apparatus for making contoured hollow fibrous articles comprising a container for a fiber-liquid mixture, a foraminous female forming die contoured to the general shape of one part of the article to be formed and adapted to be immersed in said fiber-liquid mixture, a foraminous male forming die contoured to the general shape of another part of said article to be formed and adapted to be immersed in said fiber-liquid mixture, said parts defining a substantially enclosed hollow space between them when brought together, said dies being movable one with respect to the other to permit them to be separated and brought together with said parts adjoining and defining said hollow space, and being provided with foraminous flanges extending around terminal edges of said dies and adapted to hold the flanges of a hollow article between them when said dies are brought together, means to move said dies relative to each other to bring them together in said mixture in said container a plurality of tubes extending entirely through at least one of said dies to permit introduction of the fiber-liquid mixture between said dies and into said hollow space when they are brought together, and means for providing a reduced pressure space in the interior of each said dies, said reduced pressure space communicating with the foraminous portions of said dies including said flanged portion.

*10. A method of making a fibrous article having a cavity which comprises accreting from a fiber-liquid bath fibrous separate component parts each having an extended accreted marginal open edge portion on dies at least one of which is a female die, which parts when brought together at said edge portions form an article having a cavity, bringing said edge portions together without removing said parts from said bath, and thereafter continuing to accrete fibers whereby said parts are securely united.*

*11. An apparatus for making a fibrous article having a cavity which comprises means to contain a fiber-liquid bath, separate forming dies each adapted to be submerged in said bath and to form by accretion a complemental component part, each of said dies having a porous edge portion for forming a marginal open edge portion on said component part which when brought together form an article having a cavity, means to move said dies with respect to the other to bring them in juxtaposition in said bath with said edge portions in proximity to each other, means operative to supply a fiber-liquid slurry in proximity to said edge portions, and means applying suction to at least said porous edge portions to cause said fibers to be accreted in intimate association with the joint between said edge portion.*

References Cited in the file of this patent or the original patent

UNITED STATES PATENTS

| | | |
|---|---|---|
| 549,998 | Fairbanks et al. | Nov.19, 1895 |
| 1,342,184 | Rauer | June 1, 1920 |
| 1,367,096 | Rivers | Feb. 1, 1921 |
| 1,690,528 | Bushnell | Nov. 6, 1928 |
| 1,873,585 | Harvey | Aug. 23, 1932 |
| 1,875,075 | Mason | Aug. 30, 1932 |
| 2,257,573 | Randall | Sept. 30, 1941 |

FOREIGN PATENTS

| | | |
|---|---|---|
| 304,442 | Germany | Oct. 28, 1915 |
| 133,952 | Great Britain | Apr. 13, 1921 |